US007523763B2

United States Patent
Katsuta et al.

(10) Patent No.: US 7,523,763 B2
(45) Date of Patent: Apr. 28, 2009

(54) THREE-PORT ELECTROMAGNETIC VALVE

(75) Inventors: Hiroyuki Katsuta, Tsukuba-gun (JP); Hideaki Tanaka, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 78 days.

(21) Appl. No.: 11/175,139

(22) Filed: Jul. 7, 2005

(65) Prior Publication Data
US 2006/0021664 A1    Feb. 2, 2006

(30) Foreign Application Priority Data
Aug. 2, 2004    (JP)    ............................. 2004-225886

(51) Int. Cl.
*F16K 31/08*    (2006.01)
(52) U.S. Cl. ............................. 137/625.65; 137/625.27; 251/282
(58) Field of Classification Search ............ 137/625.65, 137/625.27, 625.69; 251/282
See application file for complete search history.

(56) References Cited

U.S. PATENT DOCUMENTS

| 1,921,092 | A | * | 8/1933 | Newton | ............... | 137/625.27 |
| 4,407,323 | A | * | 10/1983 | Neff | ............... | 137/454.2 |
| 4,574,844 | A | * | 3/1986 | Neff et al. | ............... | 137/625.65 |
| 4,611,631 | A | * | 9/1986 | Kosugi et al. | ............... | 137/625.65 |
| 4,823,842 | A | * | 4/1989 | Toliusis | ............... | 137/625.65 |
| 4,915,134 | A | * | 4/1990 | Toliusis et al. | ............... | 137/625.65 |
| 6,116,276 | A | * | 9/2000 | Grill | ............... | 137/596.17 |
| 6,234,202 | B1 | * | 5/2001 | Grill | ............... | 137/596.17 |
| 6,488,050 | B1 | * | 12/2002 | Jabcon | ............... | 137/625.65 |

FOREIGN PATENT DOCUMENTS

| JP | 58-31471 | 3/1983 |
| JP | 59-105664 | 7/1984 |
| JP | 62-41970 | 3/1987 |
| JP | 11-118061 | 4/1999 |
| JP | 2000-18400 | 1/2000 |
| JP | 2000-240836 | 9/2000 |
| JP | 2002-250453 | 9/2002 |
| JP | 2003-343750 | 12/2003 |

* cited by examiner

*Primary Examiner*—John Rivell
*Assistant Examiner*—Craig M Schneider
(74) *Attorney, Agent, or Firm*—Oblon, Spivak, McClelland, Maier & Neustadt, P.C.

(57) ABSTRACT

A valve body includes a poppet type valve member disposed therein and a through hole formed thereto wherein first and second cylindrical synthetic resin retainers are fitted to the through hole. Valve seats are disposed to the end walls of both the retainers confronting each other across the central port, respectively, and a poppet seal portion is disposed to the poppet type valve member in confrontation with both the valve seats so as to open and close the valve seats of the first and second retainers. The diameters of the inner peripheral walls of both the retainers are slightly reduced in the vicinities of the ends thereof on the valve seat sides so that the effective seat diameters of the valve seats are approximately equal to the inner surface diameters of the retainers with which the slide portions of the valve member are in sliding contact.

10 Claims, 3 Drawing Sheets

THREE-PORT ELECTROMAGNETIC VALVE

TECHNICAL FIELD

The present invention relates to a three-port electromagnetic valve having a valve body in which a poppet type valve member is disposed and a drive means for driving the poppet type valve member.

PRIOR ART

Heretofore, there is well known a three-port electromagnetic valve having a valve body in which a poppet type valve member is disposed and a drive means for driving the poppet type valve member as disclosed in, for example, a patent document 1, Japanese Patent Application Publication No. 2002-250453.

As shown in FIG. 4, in the known three-port electromagnetic valve, a valve body 101, in which a poppet type valve member 102 is disposed, has a valve hole 104, through which first, second, and third ports 111, 112, and 113 are opened, and the poppet type valve member 102 is slidably accommodated in the valve hole 104 and switched by a drive means 103.

Then, in the valve hole 104, a portion nearer to an end plate 105 side than the second port 112 is formed by a retainer 106 inserted into the valve body 101 from the end plate 105 side. First and second valve seats 117, 118 are formed to the portions in which the valve body 101 confronts the retainer 106 on both the sides of the portion in which the second port 112 is opened in the valve hole 104, the first and second seal portions 115, 116 of the poppet type valve member 102 coming into contact with and separating from the first and second valve seats 117, 118. The first port 111 and the third port 113 are opened on both the sides of the second port 112 of the valve hole 104 and communicate with the second port 112 through the first and second valve seats 117, 118. Further, the poppet type valve member 102 includes slide portions 121, 122 at both the ends thereof, and each of the slide portions 121, 122 has a guide ring 123 and a seal member 124 to permit the portion to slide in the valve hole 104.

In the three-port electromagnetic valve having the above arrangement, the effective seat diameters of the first and second valve seats 117, 118 cannot actually be in coincidence with the inside diameter the valve hole 104 in vicinity of the valve seats and cannot help being set slightly outside of the inside diameter. When the inner peripheral walls of the valve hole 104 and the retainer 106 are set to predetermined inside diameters in their entireties, the action area in which fluid pressure acting on the valve member 102 acts, is different on each side of the axial direction of the valve member 102 in the space closed by the first or second seal portion 115, 116 in pressure contact with the first or second valve seat 117, 118. For example, in the space closed by the seal portion 115 and the slide portion 121 of the valve member 102, since the fluid pressure action area is larger on the seal portion 115 side, the valve member receives the action force resulting from fluid pressure according to the difference of area.

Accordingly, when a drive means having a relatively small drive force such as a plunger type solenoid and the like is used as the drive means of the poppet type valve member 102, since the action force resulting from the fluid pressure according to the difference of area cannot be ignored, the driving capability of the drive means must be increased accordingly.

DISCLOSURE OF THE INVENTION

A technical problem of the present invention is to provide a three-port electromagnetic valve capable of driving a poppet type valve member with a small force by solving the above problems of the three-port valve.

Another technical problem of the present invention is to provide a three-port electromagnetic valve in which a valve hole in a valve body has a simple shape so that the valve hole can be easily machined and a valve member and the like can be easily assembled as well as in which valve seats can be securely and stably sealed.

To solve the above problems, according to the present invention, a three-port electromagnetic valve including a valve body having a poppet type valve member disposed therein and drive means for switching a flow path by driving the poppet type valve member is characterized in that the valve body has a through hole through which three ports are opened, first and second retainers formed of synthetic resin in a cylindrical shape are fitted to both the end sides of the through hole, valve seats confronting each other across the central port opened through the through hole are disposed to the confronting end walls of both the retainers, and both the retainers have communication openings for communicating the ports located on both the sides of the central port with the center holes of the retainers, the poppet type valve member has a poppet seal portion and first and second slide portions disposed to a stem, wherein the poppet seal portion is disposed between the confronting valve seats of the first and second retainers in confrontation with the valve seats, and the first and second slide portions are slidably disposed, respectively in the central holes of both the retainers at the positions nearer to both the ends of the through hole than the communication openings, and the diameters of the inner peripheral walls of the first and second retainers are slightly reduced in the vicinities of the end portions thereof on the valve seat sides so that the effective seat diameters of the valve seats are approximately equal to the inner surface diameters of the retainers with which the slide portions of the valve members come into sliding contact.

In the three-port electromagnetic valve having the above arrangement, when the poppet type valve member is driven by the drive means, the poppet type seal portions attached to the valve member and confronting the valve seats of the first and second retainers come into contact with and separate from the valve seats and open and close them, thereby a port opened between both the retainers can be caused to communicate with any one of the other ports.

Since the effective valve seat diameters of the valve seats of the first and second retainers are made approximately equal to the inner surface diameters of the retainers with which the slide portions are in sliding contact, the forces acting on the valve member in both the axial directions thereof due to the fluid pressure in the center holes of the retainers are canceled, which permits the poppet type valve member to be driven by a small force. As a result, a small plunger type solenoid having a relatively small drive force can be used as the drive means.

The valve body of the three-port electromagnetic valve includes only the through hole through which the three ports are opened and in which the retainers are mounted and includes no slide portion with the valve seats and the valve member. Accordingly, the valve body has a simple shape and can be easily machined, and the valve member and the like can be easily assembled.

Further, since the first and second retainers are formed of the synthetic resin in the cylindrical shape and the valve seats are formed on the confronting end surfaces thereof, there can be obtained valve seats which can simply, securely, and stably make sealing as compared with the case in which valve seats are formed to a valve body formed of a metal material. Further, when the poppet seal portion mounted on the valve member closes the valve seats, even if it collides against the valve seats, impact acting therebetween is eased because the valve seats are formed of the synthetic resin, thereby the seal portions and the like are less worn and the life thereof is prolonged.

In a preferable embodiment of the three-port electromagnetic valve, the first and second retainers are formed in the same shape, the valve seats of the retainers are formed of convex ring-shaped seat portions projecting to the poppet seal portion side of the valve member, and the seal portion of the valve member is formed an elastic member having a cushion action.

In another preferable embodiment of the three-port electromagnetic valve, the first and second retainers have flange portions at the ends thereof opposite to the valve seats, and the flange portions are pressed against the wall of the valve body at both the ends through hole to thereby fix the retainers to the valve body.

Further, in a preferable embodiment of the three-port electromagnetic valve, a plunger type solenoid, which is attached to the valve body and drives the poppet type valve member by a movable iron core, is used as the drive means.

According to the three-port electromagnetic valve according to the present invention described above in detail, the three-port electromagnetic valve capable of driving the poppet type valve member with a small force can be obtained, and further the shape of the valve hole in the valve body is simplified so that the valve hole can be machined easily and the valve member and the like can be easily assembled as well as the valve seats can make sealing securely and stably.

BRIEF DESCRIPTION OF THE INVENTION

DETAILED DESCRIPTION

Figure 1:
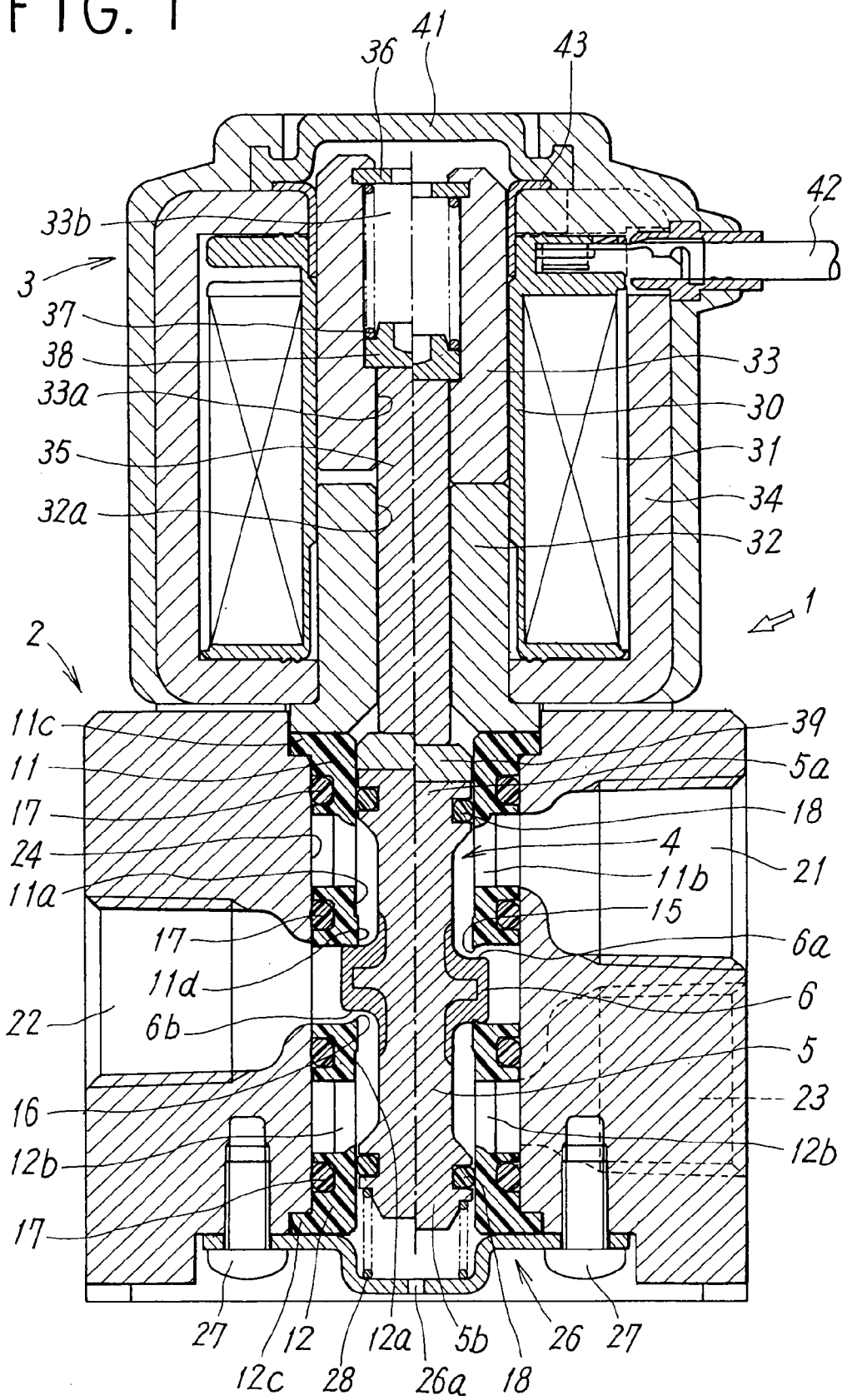
FIG. 1 is a sectional view showing an embodiment of a three-port electromagnetic valve according to the present invention, in which a left half portion shows a non-energized state of a solenoid, and a right half portion shows an energized state of the solenoid.
Figure 2:
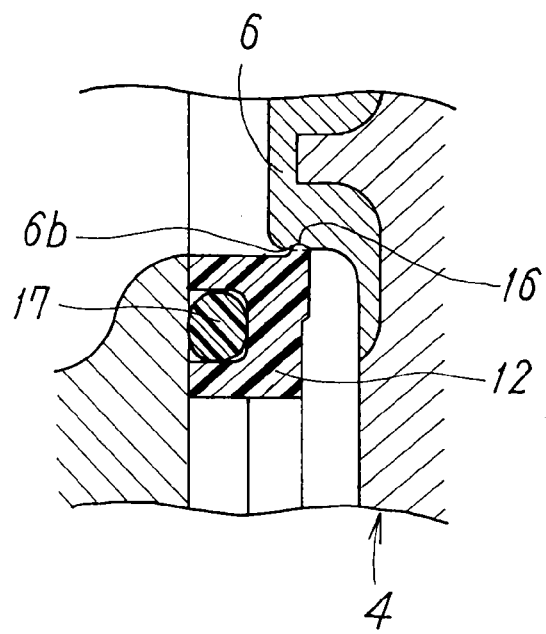
FIG. 2 is a partially enlarged sectional view explaining a closed state of a valve seat formed to a retainer.
Figure 3:
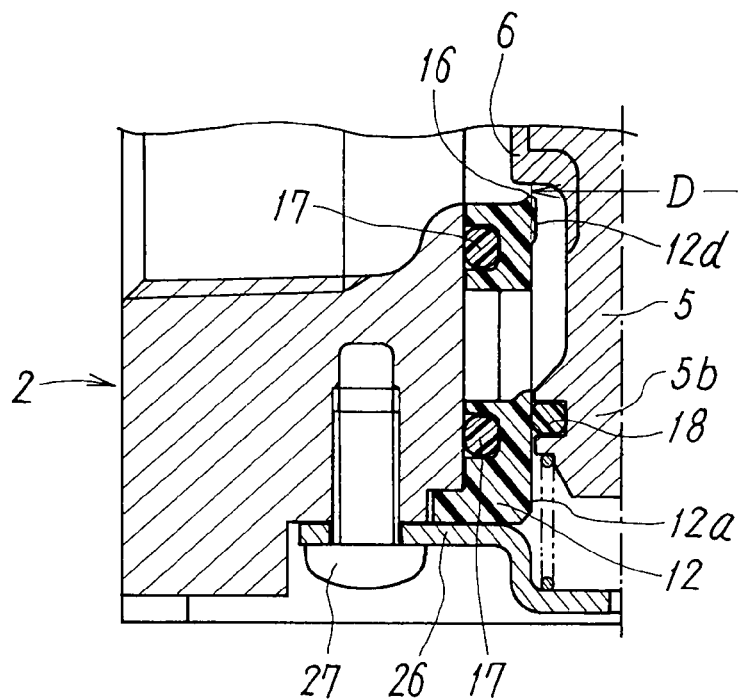
FIG. 3 is a partially enlarged sectional view of the vicinity of the retainer of FIG. 1.
Figure 4:
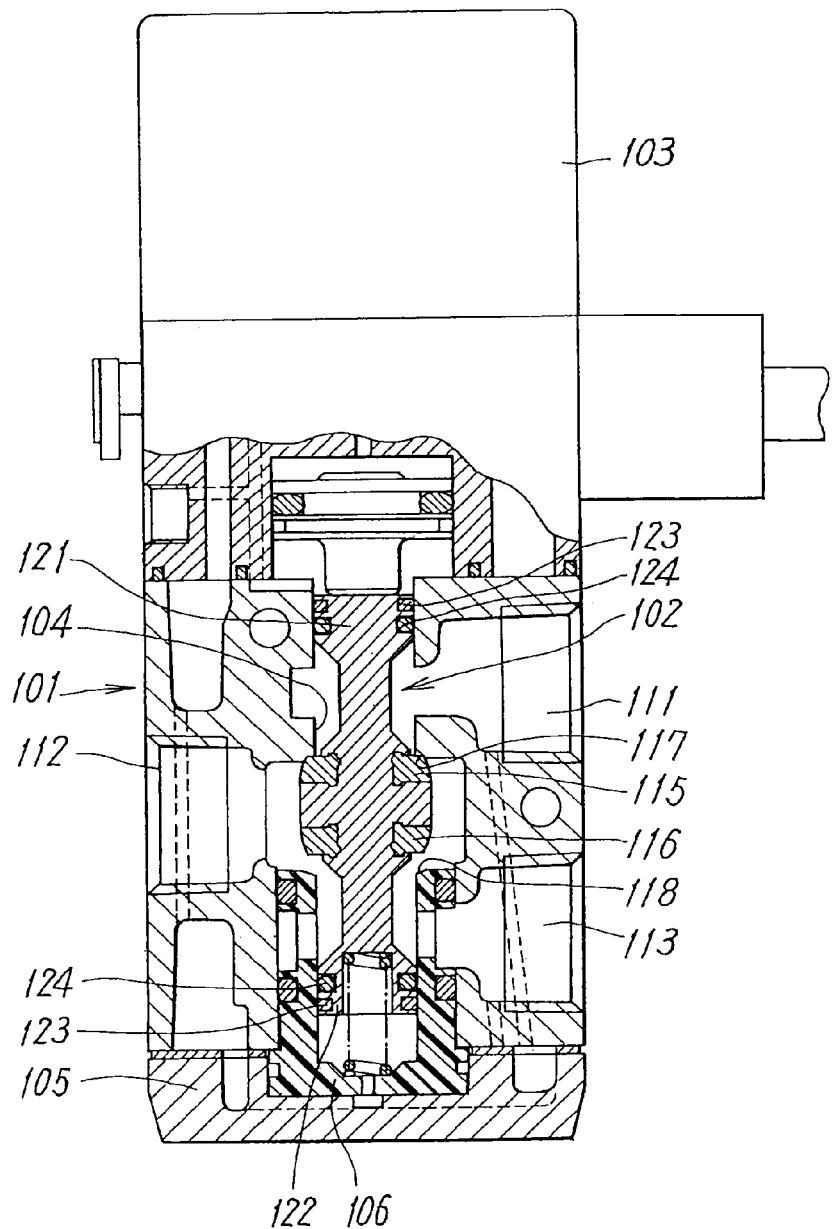
FIG. 4 is a sectional view showing the main portion of a conventionally known three-port electromagnetic valve.

FIGS. 1-3 show an embodiment of a three-port electromagnetic valve according to the present invention.

As shown in FIG. 1, the three-port electromagnetic valve 1 includes a valve body 2 in which a poppet type valve member 4 is disposed and a drive means 3 for switching a flow path by driving the poppet type valve member 4. The valve body 2 includes three ports, that is, first, second, third ports 21, 22, 23 and a through hole 24 through which these ports are opened, and first and second retainers 11, 12 formed of synthetic resin in a cylindrical shape are fitted to both the ends of the through hole 24. The retainers 11, 12 are disposed on one and the other end sides of the through hole 24 so that they confront each other, and valve seats 15, 16 are disposed to the confronting end walls of the retainers 11, 12 so as to confront each other across the central port 22 that opens through the through hole 24.

Further, communication openings 11b, 12b are disposed to the retainers 11, 12 to communicate the respective ports 21, 23 located on both the sides of the central port 22 with the central holes 11a, 12a of the retainers 11, 12 acting as a valve hole.

The first and second retainers 11, 12 have flange portions 11c, 12c at the ends thereof opposite to the end walls to which the valve seats 15, 16 are disposed, and the flange portions 11c, 12c are pressed against the wall surface of the valve body 2 at both the ends through hole 24. Further, retainers 11, 12 are fixed to the valve body 2 by being sealed with elastic seal members 17 fitted in the annular grooves on both the sides of the communication openings 11b, 12b on the outer peripheral walls thereof.

Although the retainers 11, 12 shown above have the same shape, they may be formed in a different shape, respectively. In view a manufacturing cost and an assembly job, it is advantageous to form the retainers in the same because common parts can be used.

The first retainer 11 is fixed, when the drive means 3 is attached to an end surface of the valve body 2, by pressing a fixed iron core 32 as a component of the drive means 3 against the flange portion 11c of the retainer 11. Further, the second retainer 12 is fixed by pressing an end lid 26, which is attached to an end surface of the valve body 2 by a plurality of fixing screws 27, against the flange portion 12c of the second retainer 12. The end lid 26 forms the spring seat of a return spring 28 which acts on the poppet type valve member 4 and pushes and returns it to a return position. Further, the end lid 26 has a breath hole 26a formed thereto to expose an end of the poppet type valve member 4 to the atmospheric pressure.

In contrast, the poppet type valve member 4 is arranged such that a valve stem 5 has a poppet seal portion 6 disposed in confrontation with the valve seats 15, 16 of the first and second retainers 11, 12 as well as first and second slide portions 5a, 5b are slidably disposed in the central holes 11a, 12a of both the retainers 11, 12. The first and second slide portions 5a, 5b are slidably disposed in the central holes 11a, 12a of both the retainers 11, 12, respectively at the positions nearer to both the end sides of the through hole 24 than the communication openings 11b, 12b through elastic seal members 18.

The poppet seal portion 6 in the poppet type valve member 4 is formed by fitting an elastic member having a cushion action to the annular projection of the valve stem 5. The end surfaces of the poppet seal portion 6 in the axial direction thereof are arranged as a pair of seal surfaces 6a, 6b confronting the valve seats 15, 16 and the thickness of the portions having the seal surfaces 6a, 6b is formed relatively thick so that the shock generated when the seal surfaces 6a, 6b are abutted against the valve seat 16 can be eased. This is also the same in the valve seat 15.

Further, the valve seats 15, 16, to and from which the seal surfaces 6a, 6b of the poppet seal portion 6 come into contact and separate, are formed of convex ring-shaped seat portions projecting to the poppet seal portion 6 side. Further, as shown in FIGS. 1 and 3, reduced diameter 11d, 12d are formed by slightly reducing the diameters of the inner peripheral walls of the first and second retainers 11, 12 in the vicinities of the end portions thereof on the valve seat 15, 16 sides so that the effective seat diameters D of the valve seats 15, 16 are approximately equal to the inner surface diameters of the retainers 11, 12 with which the slide portions 5a and 5b come into sliding contact. This arrangement is particularly effective when a device having a relatively small power such as a plunger type solenoid which drives the poppet type valve member 4 by a movable iron core 33 is used as the drive means 3 as described below.

That is, as shown in FIGS. 2 and 3, actually, the effective seat diameters D of the valve seats 15, 16 cannot help being set slightly outside of the inside diameter of the valve hole in the vicinities of the valve seats, when the inner peripheral surfaces of the retainers 11, 12 acting as the valve hole have a predetermined inside diameter in their entireties (that is, the reduced diameter 11d, 12d are mot provided), the effective seat diameters D are made larger than the inner surface diameters of the retainers 11, 12 with which the slide portions 5a, 5b are in sliding contact. As a result, the action area, in which the fluid pressure flowing into the central holes of the retainers 11, 12 closed by the poppet type valve member 4 and acting on the valve member 4, is made larger on the poppet seal portion 6 side than on the slide portion 5a, 5b sides.

However, since the effective seat diameters D of the valve seats 15, 16 are approximately equal to the inner surface diameters of the retainers 11, 12 with which the slide portions 5a, 5b are in sliding contact, the forces acting in both the axial directions of the valve member due to the fluid pressure in the central holes of the retainers are canceled. Accordingly, the poppet type valve member can be driven with a small force, thereby the plunger type solenoid having a relatively small drive force can be used as the drive means.

In the plunger type solenoid constituting the drive means 3 of the embodiment, the fixed iron core 32 is fixed in a bobbin 30 around which a coil 31 is wound as well as the movable iron core 33, which is attracted to the fixed iron core 32, is slidably inserted into the bobbin 30, a magnetic path is formed by a frame 34 surrounding the periphery of the coil 31, and they are fixed to the valve body 2 by a not shown fixing means.

Further, the fixed iron core 32 has a through hole 32a through which a push bar 35 pushed by the movable iron core 33 passes.

The movable iron core 33 permits the push bar 35 to be slidably inserted into a spring chamber 33b through a through hole 33a formed therein, the urging force of a spring 37 supported by a presser plate 36 in the spring chamber 33b is applied to the push bar 35 through a spring seat 38 to thereby transmit the force of the push bar 35 to the valve member 4 through a damper 39.

An elastically deformable manual button 41 is disposed in an opening formed to the end surface of the frame 34 at the center thereof to manually depress the movable iron core 33. In the figure, reference numeral 42 denotes a lead wire for energizing the coil 31, and 43 denotes a magnetic sleeve interposed between the frame 34 and the movable iron core.

In the drive means 3, when the coil 31 is not energized, since the return spring 28 pushes the valve stem 5, the valve stem 5 pushes and returns the movable iron core 33 to the return position through the damper 39, the push bar 35, the spring seat 38, and the spring 37. Since the poppet seal portion 6 of the valve stem 5 moves to the position shown by the left half portion of FIG. 1, the poppet seal portion 6 opens the valve seat 16 of the second retainer 12 as well as is pressed against the valve seat 15 of the first retainer 11 and closes the valve seat 15. Accordingly, the communication of the first port 21 with the second port 22 is interrupted, and the second port 22 is kept in communication with the third port 23.

When the coil 31 is energized, since the movable iron core 33 is magnetically attracted to the fixed iron core 32, it depresses the valve stem 5 through the spring 37, the spring seat 38, the push bar 35, and the damper 39, thereby the valve stem 5 is moved to the right half portion of FIG. 1. Accordingly, the poppet seal portion 6 opens the valve seat 15 as well as closes the valve seat 16, the communication of the second port 22 with the third port 23 is interrupted, and the second port 22 communicates with the first port 21.

Accordingly, when the first port 21 is used as a supply port, the second port 22 is used as an output port, and the third port 23 is used as a discharge port, the three-port electromagnetic valve 1 is arranged as a normally-closed-type three-port electromagnetic valve, and when the first port 21 is used as the discharge port, the second port 22 is used as the output port, and the third port 23 is used as the supply port, the three-port electromagnetic valve 1 is arranged as a normally-open-type three-port electromagnetic valve.

The valve body 2 of the three-port electromagnetic valve 1 having the above arrangement includes only the axial through hole 24 through which the three ports 21, 22, 23 are opened and in which the retainers 11, 12 are mounted and includes no slide portion with the valve seats 15, 16 and the valve member 4. Accordingly, the valve body 2 has a simple shape and can be easily machined, and the valve member and the like can be easily assembled.

Further, since the first and second retainers 11, 12 are formed of the synthetic resin in the cylindrical shape and the valve seats 15, 16 are formed on the confronting end surfaces thereof, there can be obtained valve seats which can simply, securely, and stably make sealing as compared with the case in which the valve seats are formed to a valve body 2 formed of a metal material. Moreover, when the poppet seal portion 6 mounted on the valve member 4 closes the valve seats 15, 16, even if it collides against the valve seats, impact acting therebetween is eased because the valve seats are formed of the synthetic resin, thereby the seal portions and the like are less worn and the life thereof is prolonged.

Further, since the first and second slide contact portions of the poppet type valve member 4 are in sliding contact with the inner peripheral walls of the retainers 11, 12 formed of the synthetic resin in the cylindrical shape, the sliding property of the slide portions is better than that of the slide portions which are in sliding contact with the inner peripheral walls of the valve hole of a conventional metal valve body. Accordingly, the guide rings and the seal members attached to the first and second slide portions are less worn.

The invention claimed is:

1. A three-port electromagnetic valve including a valve body having a poppet type valve member disposed therein and a drive mechanism for switching a flow path by driving the poppet type valve member, the valve body having a through hole through which first, second and third ports of the valve body are opened; which comprises:
   first and second retainers formed of synthetic resin which are cylindrically shaped and which are fitted to both end sides of the through hole, respectively, and which have center holes formed therein,
   convex ring-shaped valve seats positioned opposite each other across the second port of the valve body and which are disposed so as to be positioned, respectively, at opposite end walls of each of the retainers, wherein each of the retainers have communication openings formed therein for communicating with the first and third ports, located on opposite sides of the second port of the valve body, and with the center holes formed in the first and second retainers, respectively; wherein the poppet type valve member has a poppet seal portion and first and second slide portions which are disposed to form a stem wherein the poppet seal portion is disposed between the opposite convex ring-shaped valve seats and is positioned opposite the first and second retainers, and an O-ring shaped elastic sealing member positioned in said valve body, wherein the first and second slide portions are continuously slidably disposed in said valve body and are maintained therein via said O-ring-shaped elastic sealing member, respectively, said slide portions being positionable in the central holes of both the retainers at positions in closer proximity with both ends of the through hole than with the communication openings;

the first and second retainers having reduced diameter portions formed by reducing a diameter portion of the inner peripheral wall of the retainers in proximity with each of the end portions of the sides of the valve seats, the valve seats being formed on end portions of reduced diameter portions of the first and second retainers, and wherein effective seat diameters of the valve seats are larger than inside diameters of said reduced diameter portions of the first and second retainers and are equal to inner surface diameters of the retainers of the first and second retainers with which the slide portions of the valve members come into sliding contact such that, when said poppet seal portion contacts said first and second valve seats and the center holes of the first and second retainers are closed by said poppet seal portion and by said elastic sealing member, fluid pressure forces inversely acting on the valve members in the closed center holes of said first and second retainers are equalized.

2. A three-port electromagnetic valve according to claim 1, the drive mechanism further comprising a plunger type solenoid attached to the valve body and having a movable iron core so as to drive the poppet type valve member by said movable iron core.

3. A three-port electromagnetic valve according to claim 1, wherein the first and second retainers are of a same shape, the first and second retainers have flange portions positioned at ends thereof opposite the valve seats, the flange portions are pressed against the wall of the valve body at both ends of the through hole to thereby maintain the first and second retainers stationary with respect to the valve body, outer diameters of the first and second retainers are uniform in size except at the flange portions thereof, and the through hole has a uniform diameter except for portions thereof into which the flange portions of the first and second retainers are positioned.

4. A three-port electromagnetic valve according to claim 3, the drive mechanism further comprising a plunger type solenoid attached to the valve body and having a movable iron core so as to drive the poppet type valve member by said movable iron core.

5. A three-port electromagnetic valve according to claim 3, wherein the valve seats are formed of convex ring-shaped seat portions projecting to a poppet seal portion side of the valve member, the seal portion of the valve member further comprising an elastic valve member.

6. A three-port electromagnetic valve according to claim 5, the drive mechanism further comprising a plunger type solenoid attached to the valve body and having a movable iron core so as to drive the poppet type valve member by said movable iron core.

7. A three-port electromagnetic valve according to claim 1, wherein the valve seats are formed of convex ring-shaped seat portions projecting to the poppet seal portion side of the valve member, and wherein the seal portion of the valve member comprises an elastic member.

8. A three-port electromagnetic valve according to claim 7, the drive mechanism further comprising a plunger type solenoid attached to the valve body and having a movable iron core so as to drive the poppet type valve member by said movable iron core.

9. A three-port electromagnetic valve according to claim 7, wherein the first and second retainers have flange portions at ends thereof opposite to the valve seats, and the flange portions are pressed against the wall of the valve body at both ends of the through hole to thereby maintain the first and second retainers stationary with respect to the valve body.

10. A three-port electromagnetic valve according to claim 9, the drive mechanism further comprising a plunger type solenoid attached to the valve body and having a movable iron core so as to drive the poppet type valve member by said movable iron core.

* * * * *